United States Patent
Schüddekopf et al.

(10) Patent No.: US 12,304,297 B2
(45) Date of Patent: May 20, 2025

(54) BATTERY CARRIER FOR AN ELECTRICALLY DRIVEN VEHICLE AND METHOD OF MANUFACTURING SUCH A BATTERY CARRIER

(71) Applicant: Nemak, S.A.B. de C.V., Nuevo Leon (MX)

(72) Inventors: Sven Schüddekopf, Göttingen (DE); Richard Franzmann, Frankfurt am Main (DE); Jan Scheil, Wiesbaden (DE); Udo Kreutzarek, Singen (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 18/700,846

(22) PCT Filed: Oct. 10, 2022

(86) PCT No.: PCT/IB2022/059671
§ 371 (c)(1),
(2) Date: Apr. 12, 2024

(87) PCT Pub. No.: WO2023/062496
PCT Pub. Date: Apr. 20, 2023

(65) Prior Publication Data
US 2024/0408951 A1    Dec. 12, 2024

(30) Foreign Application Priority Data

Oct. 13, 2021 (EP) ..................................... 21202414

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/66* (2019.02); *H01M 50/224* (2021.01);
(Continued)

(58) Field of Classification Search
CPC ...... H01M 50/224; H01M 50/247; B60K 1/04
See application file for complete search history.

(56) References Cited

U.S. PATENT DOCUMENTS 11,691,493 B2 * 7/2023 Stephens .................. B60K 1/04
429/96

FOREIGN PATENT DOCUMENTS

| CN | 109461852 A | 3/2019 |
| CN | 112531261 A | 3/2021 |

(Continued)

*Primary Examiner* — Jason D Shanske
*Assistant Examiner* — James J Triggs
(74) *Attorney, Agent, or Firm* — The Webb Law Firm

(57) ABSTRACT

The invention provides a battery carrier which is provided for being fastened in a floor region of a supporting structure of an electrically driven motor vehicle. The battery carrier with a floor section and a side wall running around the floor section delimits a receiving space for at least one battery element to be positioned there. The side wall includes at least two side wall sections which are aligned at an angle β of more than 0° relative to the floor section and meet in a corner region. In a such a battery carrier, the floor section is formed in one piece from a first aluminum material and side wall sections of the side wall meeting at least in one of the corner regions in each case, including the respective corner region, are formed in one piece from a second aluminum material which has a higher elongation at break A than the first aluminum material. The invention further discloses a method of manufacturing a battery carrier of the type according to the disclosure.

13 Claims, 3 Drawing Sheets

(51) Int. Cl.
*H01M 50/224* (2021.01)
*H01M 50/247* (2021.01)

(52) U.S. Cl.
CPC ... *H01M 50/247* (2021.01); *B60K 2001/0438* (2013.01); *H01M 2220/20* (2013.01)

(56) References Cited

FOREIGN PATENT DOCUMENTS

| | | |
|---|---|---|
| DE | 102011101586 A1 | 11/2012 |
| DE | 102017102685 A1 | 8/2018 |
| DE | 102017120533 A1 | 3/2019 |
| DE | 102019101637 A1 | 7/2020 |
| JP | 2021068523 A | 4/2021 |

\* cited by examiner

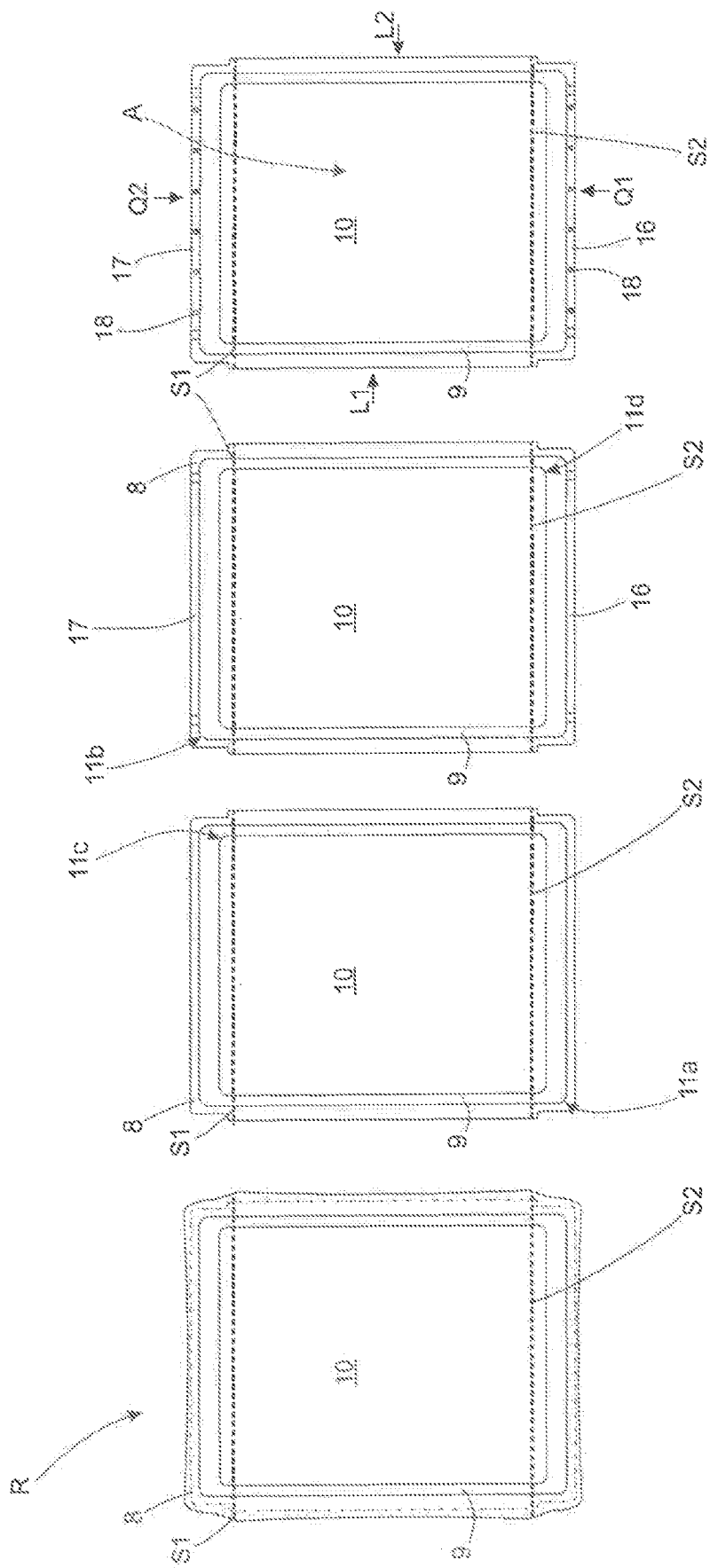

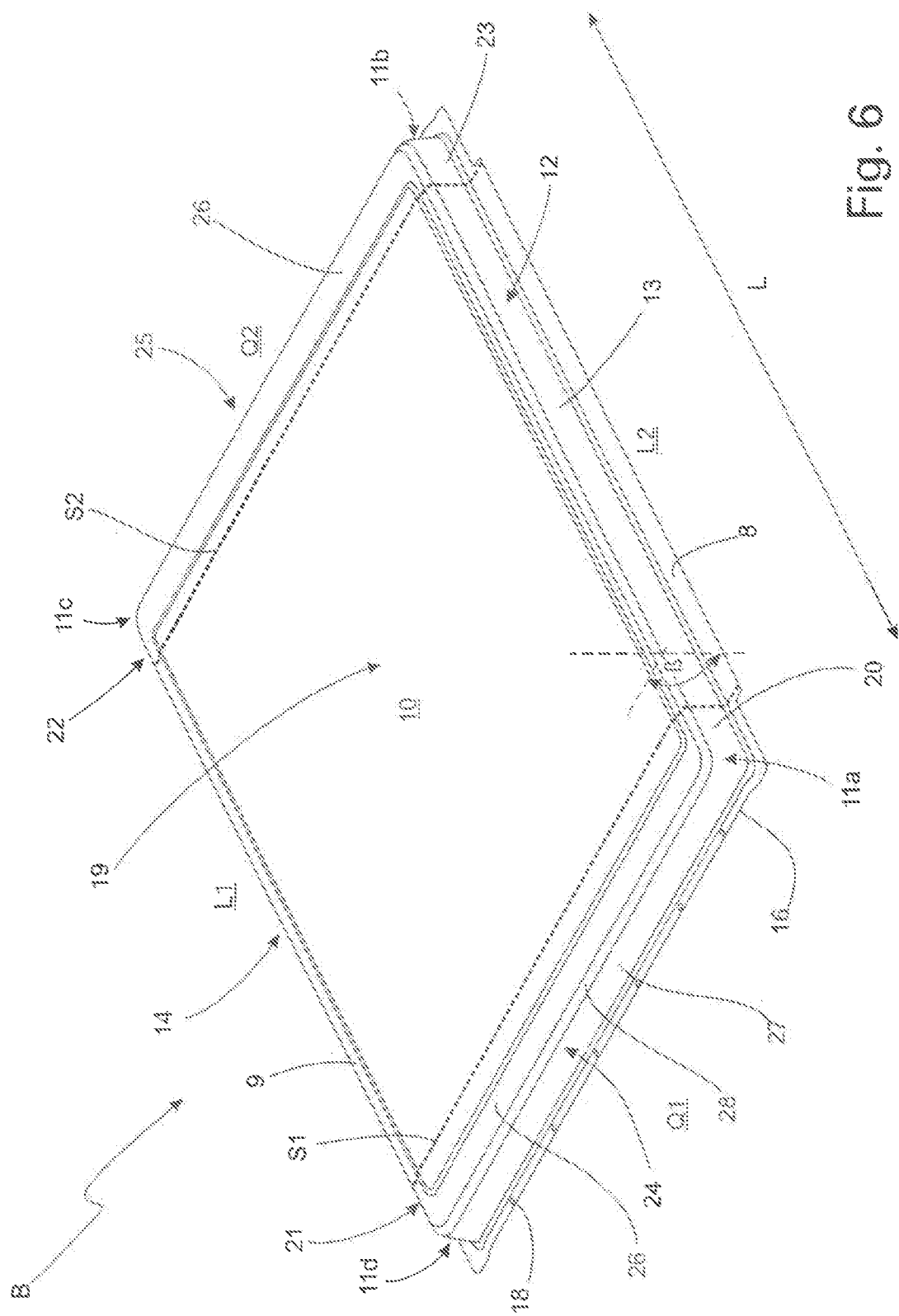

BATTERY CARRIER FOR AN ELECTRICALLY DRIVEN VEHICLE AND METHOD OF MANUFACTURING SUCH A BATTERY CARRIER

CROSS-REFERENCE TO RELATED APPLICATIONS

This application is the United States national phase of International Patent Application No. PCT/IB2022/059671 filed Oct. 10, 2022, and claims priority to European Patent Application No. 21202414.5 filed Oct. 13, 2021, the disclosures of which are hereby incorporated by reference in their entireties.

BACKGROUND OF THE INVENTION

Field of the Invention

The invention relates to a battery carrier which is provided for being fastened in a floor region of a supporting structure of an electrically driven motor vehicle, wherein the battery carrier with a floor section and a side wall section circulating the floor section delimits a receiving space for battery elements to be positioned there.

The invention also relates to a method of manufacturing such a battery carrier.

Description of Related Art

Battery carriers of the type in question here, also referred to as "battery carriers" in technical terminology, accommodate the storage units in which the electrical energy required to drive the motor vehicle is stored. These usually rechargeable energy storage devices are generally referred to synonymously as "batteries" or "accumulators". For the sake of simplicity, the term "battery" is therefore used throughout this text to refer to the energy storage devices in question. Batteries of this type are usually composed of several cell-like battery elements.

In contrast to the batteries used in motor vehicles with combustion engines, which are typically operated at voltages of 12 V or 24 V, batteries in which the electrical energy for the drive of electric vehicles is stored have a high voltage, which is typically in the range of 300-1000 V. Lithium-ion batteries, which enable a high energy density and are characterized by a comparably long service life, are state of the art. However, such Li-ion batteries are sensitive to mechanical and thermal loads. Damage to the battery elements can lead to fires and the release of toxic components. These toxic components can pose a considerable hazard if they are released into the environment in an uncontrolled manner. For example, if the highly reactive lithium metal of a Li-ion battery comes into contact with water, the water molecules are decomposed into their components, hydrogen and oxygen, which form a highly explosive gas mixture.

For these reasons, battery carriers of the type in question here must be designed in such a way that the battery elements arranged in them can not only be protected against mechanical damage during normal driving and in the event of an accident, but also reliably prevent the contents of the battery elements from escaping into the environment in the event of a leak.

SUMMARY OF THE INVENTION

Against the background of the state of the art described above, the task has arisen of creating a battery carrier that meets strictest requirements for gas- and liquid-tight shielding and protection of the batteries against mechanical damage, while at the same time being easy to manufacture.

A method for manufacturing such a battery carrier should also be provided.

The invention has solved this problem by means of a battery carrier which has at least the features as described herein.

The invention has also solved this problem by the method as described herein.

Advantageous embodiments of the invention are given in the dependent claims and, like the general idea of the invention, are explained in detail below.

A battery carrier according to the invention, which is provided for being fastened in a floor region of a supporting structure of an electrically driven motor vehicle, thus delimits a receiving space for at least one battery element to be positioned there with a floor section and a side wall extending around the floor section. The side wall comprises at least two side wall sections which are angled at an angle of more than 0° to the floor section and meet in a corner area.

In accordance with the invention, the floor section of the battery carrier is formed in one piece from a first aluminum material. At the same time, side wall sections of the side wall which meet in at least one of the corner regions, including the respective corner region, are formed in one piece from a second aluminum material which has a higher elongation at break A than the first aluminum material.

Typically, the first aluminum material used according to the invention for the floor section has a tensile strength Rm of at least 170 MPa (Rm≥170 MPa), for example at least 220 MPa (Rm≥220 MPa), in particular at least 240 MPa (Rm≥240 MPa), and an elongation at break A of up to 10% (A 10%), in particular up to 8% (A≤8%). Aluminum materials with such a range of properties are referred to as "high-strength aluminum materials" by experts, as in the present text.

In contrast, the elongation at break A of the second aluminum material, from which the side wall sections meeting in a corner region and the relevant corner region itself are formed in one piece, is typically at least 10% (A≥10), in particular at least 15% (A≥15%). Aluminum materials with such a high elongation at break A are referred to in technical terminology, as in the present text, as "ductile aluminum materials".

In this sense, the floor section of a battery carrier according to the invention thus consists of a high-strength aluminum material, while at least the side wall sections meeting in a corner region and the relevant corner region formed in one piece with them consist of a ductile aluminum material.

A battery carrier according to the invention is thus characterized by the fact that it is made entirely of aluminum materials. This gives it a significantly lower weight compared to conventional sheet steel constructions.

The invention is based on the idea of using an aluminum material for the floor section, which is exposed to the greatest loads from stone impact and the like during use and must also bear the weight of the battery elements, which has a high strength and as such can safely withstand the mechanical loads acting on it. On the other hand, additional complex-shaped or difficult-to-form forming elements are placed in the area of those side wall sections of the battery carrier that are made of an aluminum material with increased elongation properties compared to the material of the floor section and correspondingly optimized formability. In this way, it is possible to form the battery carrier according to the invention in one piece from a suitably shaped sheet metal blank by forming, despite the insufficient formability of the floor section consisting of high-strength aluminum material for complex shaping.

The particular advantage of this procedure is that it is no longer necessary to preform certain sections of the battery carrier separately from one another in separate work steps and then subsequently join them together, in particular by welding or bonding. Instead, a sheet metal blank can be used for the manufacture of a battery carrier according to the invention, the sections of which, consisting of different Al materials, are joined together using proven joining techniques, in particular welding or bonding techniques, in such a way that a firm and tight cohesion of these sections is ensured even after the blank has been formed into the battery carrier.

In this respect, the invention uses the principle of manufacturing components which are subject to different local requirements (see, for example, DE 10 2011 101 586 B4), which is based on the use of so-called tailored-welded blanks and has proven itself in practice. The invention not only makes it possible to provide a low-weight battery carrier that reliably fulfills the requirements placed on its load-bearing capacity. Moreover, the tightness of the connection between the individual sections of a battery carrier according to the invention is always guaranteed. This is achieved not least by the fact that the corner areas of the battery carrier, which are particularly critical in terms of shaping and cracking, are located exclusively in the side wall sections, which are made of ductile, easily deformable aluminum material. In this way, despite the deformations that inevitably occur during use and the associated stresses occurring in the battery carrier, a permanently tight shielding of the battery elements arranged in the battery carrier from the environment is ensured.

In accordance with the foregoing explanations, a method according to the invention for producing a battery carrier which is provided for being fastened in a floor region of a supporting structure of an electrically driven motor vehicle, wherein the battery carrier with a floor section and a side wall running around the floor section delimits a receiving space for battery elements to be positioned there and wherein the side wall comprises at least two side wall sections which are aligned at an angle β of more than 0° with respect to the floor section and meet in a corner region, comprises the following steps:
  a) providing a sheet metal blank which comprises a central section, which consists of a first aluminum material, and at least two side sections which are joined with their respective associated edge to opposite edges of the central section and consist at least in sections of a second aluminum material, the first aluminum material having an elongation at break A which is less than the elongation at break A of the second aluminum material;
  b) forming the sheet metal blank into the battery carrier, forming a floor section and a side wall of the battery carrier running around the floor section, wherein, in the course of the forming, the corner regions in which two side wall sections of the side wall meet are formed exclusively from the sections of the sheet metal blank consisting of the second aluminum material;
  c) optionally trimming of an edge area of the circumferential side wall;
  d) optionally additional forming of the side wall or the floor section to form at least one additional shaping element;
  e) optionally insertion of openings in the battery carrier.

The central floor section of a battery carrier according to the invention, consisting of the higher-strength Al material, is for example essentially flat, so that it is deformed at most with low degrees of deformation during the shaping of the battery carrier. If necessary, the floor section can of course be provided with beads and comparable shaping elements which can be formed despite the limited deformability of the high-strength material from which the floor section is made. Such shaping elements can, for example, improve the rigidity of the floor section or facilitate the fastening and alignment of the battery elements to be arranged in the battery carrier.

Similarly, the central section of the sheet metal plate can be designed in such a way that it not only forms the floor section of a battery carrier according to the invention, but also at least one section of the side wall, which should, for example, have a particular strength. This is particularly suitable if the wall section in question is simply shaped, for example only has straight, parallel side walls or edges. Ideally, these should merge into the adjacent side wall section or the floor section with such large bending radii that cracks are reliably avoided. The geometries suitable for this can be determined in a known manner depending on the strength and elongation properties of the aluminum material used for the floor section.

Accordingly, a practical embodiment of the invention, which makes optimum use of the potential of the two differently strong and differently ductile aluminum materials processed according to the invention, provides for the battery carrier to have a higher-strength side wall section on each of two opposite sides, which is formed in one piece with the floor section from the higher-strength aluminum material of the floor section, wherein in each case one of the ductile side wall sections, which have a corner region of the battery carrier between them, forms an extension of the respective higher-strength side wall section, which can extend in particular along the floor section.

For example, the floor section of a battery carrier according to the invention, viewed from above, can have a rectangular basic shape, in which a higher-strength side wall section extends on each of the opposite longitudinal sides of the floor section, the higher-strength side sections being extended on their sides associated with the corner regions of the battery carrier by a ductile side wall section joined to them, in particular welded to them.

Also in the embodiments of the invention, in which the side wall of the battery carrier has at least one side wall section which is formed in one piece with the floor section from a higher-strength aluminum material, the corner regions which are critical with regard to the forming behavior, in particular the risk of cracking, are in this way laid in the section of the battery carrier or the sheet metal blank used for its manufacture, which consists of the easily formable, ductile aluminum material.

All joining methods known in practice for this purpose can be used to join the floor section consisting of the first, higher-strength, Al material with the side wall sections consisting of the second, ductile, Al material. These include in particular welding processes, such as laser welding or friction stir welding processes, but also bonding processes or other known processes by means of which the sections to be joined together, consisting of different materials, can be permanently tightly and firmly connected to each other by means of a material, force and/or form fit.

In the case of a sheet metal blank with which it is possible to form a battery carrier in accordance with the above explanations, the central section of the sheet metal blank provided in step a) of the method according to the invention extends over the entire width of the sheet metal blank, but only over a section of the length of the sheet metal blank, wherein during the forming in step b) of the method according to the invention, the mutually opposite edge sections of the central section extending between the ductile side sections of the sheet metal blank are each formed into a higher-strength side wall section of the battery carrier.

For the forming of sheet metal blanks configured according to the invention into a battery housing according to the invention, all known deep-drawing processes proven for the forming of welded tailored blanks are particularly suitable, as they are also used, for example, in the prior art such as DE 10 2011 101 586 B4.

If mechanical properties of aluminum materials, such as tensile strength Rm or elongation at break A, are specified in this text, these have been determined in accordance with the standards DIN EN ISO 6892-1:2020-06 and DIN 50125: 2016-12.

The angle β included between the floor section and the circumferential side wall of a battery carrier according to the invention is greater than 0° in each case, which means that the floor section and the circumferential side wall section run in planes aligned at an angle to each other. Typically, the angle β is in the range of 80° to 135°, in particular 85° to 120°, whereby angles β of ≥90° are particularly practical from a manufacturing point of view. It goes without saying that the information given here on the angle β is not to be understood in a strictly mathematical sense, but in a technical sense, i.e. with the tolerances that are unavoidable in production and usually permitted in practice.

For example, all Al alloys classified in the 6000, 7000 or 8000 series of aluminum materials according to the nomenclature developed by the Aluminum Association are suitable as the first, higher-strength Al material for the floor section. The materials in the 6000 series have proven to be particularly suitable. These include, for example, the materials EN AW-6101, EN AW-6101A, EN AW-6101B, EN AW-6201, EN AW-6401, EN AW-6003, EN AW-6005, EN AW-6005A, EN AW-6005B, EN AW-6106, EN AW-6008, EN AW-6110A, EN AW-6011, EN AW-6012, EN AW-6012A, EN AW-6013, EN AW-6014 EN, AW-6015, EN AW-6016, EN AW-6018, EN AW-6023, EN AW-6025, EN AW-6026, EN AW 6050, EN AW-6351, EN AW-6351A, EN AW-6951, EN AW-6056, EN AW-6060, EN AW-6360, EN AW-6061A, EN AW-6261, EN AW-6262, EN AW-6262A, EN AW-6063, EN AW-6063A, EN AW-6463, EN AW-6064A, EN AW-6065, EN AW-6081, AW-6181, EN AW-6082, EN AW-6182, EN AW-6082A.

The above-mentioned alloys meet the requirements according to the invention for the higher-strength aluminum material of the floor section with regard to its tensile strength Rm of at least 170 MPa (Rm≥170 MPa), in particular at least 220 MPa (Rm≥220 MPa), and elongation at break A of less than 10% (A≤10%), in particular less than 9% (A<10%), such as up to 8% (A≤8%) or up to 7% (A≤7%). High-strength Al materials with a tensile strength Rm of at least 240 MPa, in particular at least 250 MPa, have proven to be particularly suitable.

As a rule, with increasing tensile strength Rm, the elongation at break A and thus the formability decreases. Thus, Al materials preferably used for the floor section according to the invention typically only have an elongation at break A of up to 7% (A≤7%) at a tensile strength Rm of at least 250 MPa. Tensile strengths of up to 250 MPa (Rm≥250 MPa) and elongations at break A of up to 7% (A≤7%) of the high-strength Al materials intended for the higher-strength floor section of a battery carrier according to the invention prove to be particularly suitable for the purposes according to the invention in view of the requirements placed on their strength and ductility. Examples of Al materials which fulfill the requirements of the invention for the material of the central floor section are, for example, those under the designation EN AW-6003, EN AW-6005, EN AW 6005A, EN AW-6005B, EN AW-6060, EN AW-6061A, EN AW-6063, EN AW-6063A.

For the side wall sections and corner regions of the side wall of a battery carrier according to the invention consisting of the second, ductile, Al material, on the other hand, materials are used which have an elongation at break A of at least 10% (A≥10%), in particular at least 15% (A≥15%), preferably at least 20% (A≥20%). The tensile strength Rm of these materials is typically at most 240 MPa (Rm≤240 MPa), in particular at most 230 MPa (Rm≤230 MPa), whereby tensile strengths of 180 MPa to 240 MPa (180 MPa≤Rm≤240 MPa), in particular up to 230 MPa (Rm≤230 MPa, in particular 180 MPa≤Rm≤230 MPa), and elongations at break A of 13% to 28% (13%≤A≤28%) are particularly practical.

According to the nomenclature of the Aluminum Association, ductile Al materials that meet the requirements that the invention places on the side wall sections belong to the 3000, 4000 or 5000 series of Al materials. The materials of the 5000 series in particular have proven themselves here. This series includes the materials EN AW-5005, EN AW-5005A, EN AW-5305, EN AW-5505, EN AW-5605, EN AW-5006, EN AW-5010, EN AW-5110, EN AW-5210, EN AW-5310, EN AW-5018, EN AW-5018B, EN AW-5019, EN AW-5119, EN AW-5119A, EN AW-5026, EN AW-5040, EN AW-5042, EN AW-5049, EN AW-5149, EN AW-5249, EN AW-5449, EN AW-5449A, EN AW-5050, EN AW-5050A, EN AW-5051A, EN AW-5251, EN AW-5052, EN AW-5252, EN AW-5352, EN AW-5154A, EN AW-5154B, EN AW-5354, EN AW-5454, EN AW-5554, EN AW-5654, EN AW-5654A, EN AW-5754, EN AW-5356, EN AW-5356A, EN AW-5456, EN AW-5456A, EN AW-5456B, EN AW-5556A, EN AW-5556B, EN AW-5657, EN AW-5058, AW-5059, EN AW-5070, EN AW-5082, EN AW-5182, EN AW-5083, EN AW-5183, EN AW-5183, EN AW-5283A, EN AW-5383, EN AW-5086, EN AW-5186, EN AW-5087, EN AW-5187, EN AW-5088. Of these, for example, the Al materials EN AW-5005, EN AW-5005A, EN AW-5083, EN AW-5654A, EN AW-5754 are particularly suitable for the purposes of the invention.

The side wall sections consisting of the ductile Al material are also shaped in such a way that the critical areas with regard to deformation and cracking are shifted away from the less deformable floor section. For this purpose, the ductile side wall sections can have a first side wall zone on the floor side, which is connected to the respective assigned edge of the floor section in the manner of a lateral extension and only merges into the corner area after a certain distance from the less deformable floor section, via which the zone of the side wall aligned at a larger angle in relation to the floor section is connected to the floor section. This configuration is particularly useful for those ductile side wall sections which run along the joint seam via which the respective section of a battery carrier according to the invention consisting of ductile material is connected to its section consisting of higher-strength material. By designing the ductile side wall sections in this way, stresses that can occur during the shaping or use of the battery housing can be kept away from the joint. This also helps to minimize the risk of cracking in the area of the joint in question.

After forming the sheet metal blank according to the invention (steps a) and b) of the method according to the invention, the resulting battery carrier component can undergo further forming steps in a manner known per se, for example to form further forming elements on the side wall or the floor section. These shaping elements can be, for example, a flange that can be used to attach the battery carrier to a vehicle body, beads or other structures that serve to stiffen the respective side wall section, or indentations, protrusions or the like that can be used to fix, attach or position the battery elements to be arranged in the battery carrier.

The battery carrier obtained after the forming process can also optionally be trimmed in a known manner in an edge area of the surrounding side wall in order to remove excess sheet material.

Finally, if necessary, openings can also be optionally formed, in particular punched or drilled, in the battery carrier, which are required for fastening the battery carrier to a vehicle body or for auxiliary means for fastening the battery elements in the battery carrier.

BRIEF DESCRIPTION OF THE DRAWINGS

The invention is explained in more detail below with reference to a drawing illustrating an embodiment example. It shows schematically in each case:

FIG. 2 a top view of a blank formed from the sheet metal blank according to FIG. 1A by a deep-drawing operation;

FIG. 3 top view of the blank according to FIG. 2 after trimming;

FIG. 4 top view of the blank according to FIG. 3 after further forming;

FIG. 5 top view of a finished battery carrier; and

FIG. 6 a perspective view of the underside of the finished battery carrier.

DESCRIPTION OF THE INVENTION

Figure 1B:
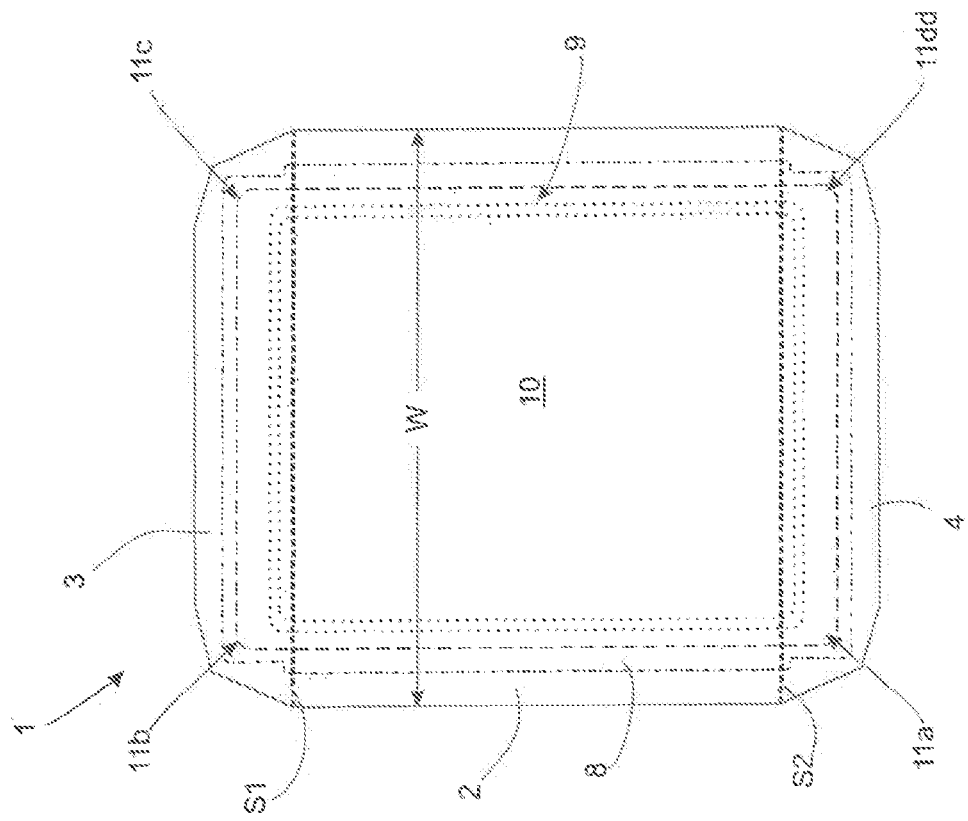
FIG. 1B is a plan view of the individual parts from which the sheet metal plate according to FIG. 1A is assembled.
Figure 1A:
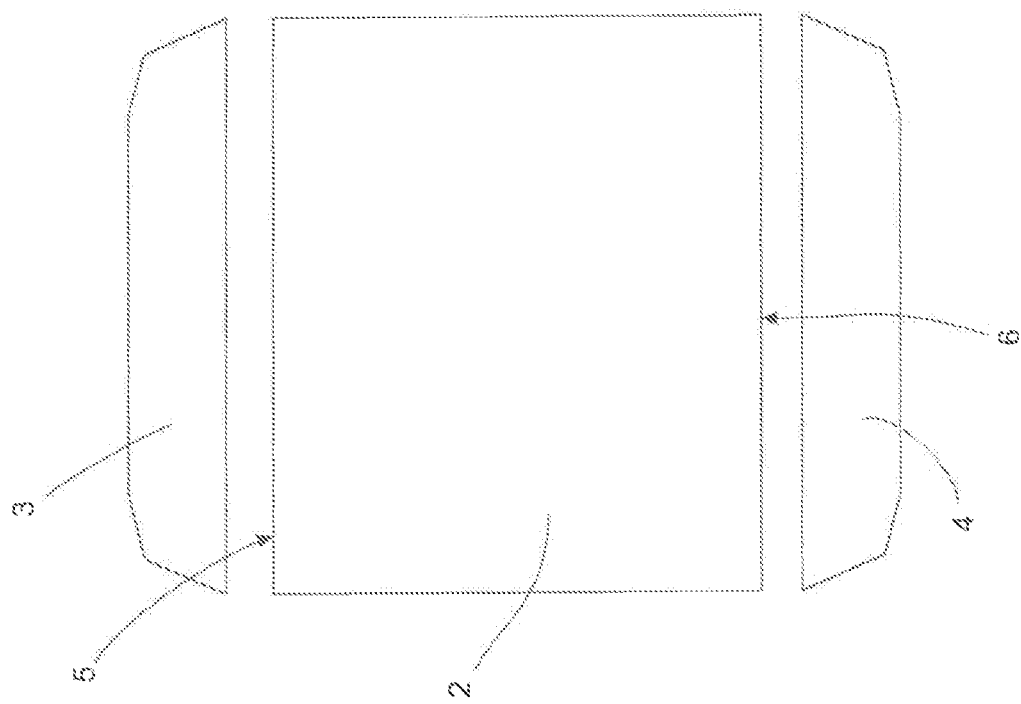
FIG. 1A a sheet metal blank for the manufacture of a battery carrier in plan view.

The sheet metal blank 1 provided for the manufacture of the battery carrier B, shown in FIG. 1A, is composed of a central section 2 and two side sections 3, 4. The central section 2, which is rectangular in plan view, extends across the entire width W of the sheet metal plate 1 and takes up the majority, in this case around five-sevenths of its length L. In each case, one of the identically shaped side sections 3, 4 is connected, in particular welded, with its respective associated edge to one of the edges 5, 6 of the central section 2 aligned transversely to the longitudinal extent of the sheet metal blank 1.

The side sections 3, 4 can be joined to the central section 2 using a variety of joining methods that have proven themselves in the prior art for producing permanently tight and durable joints. These include, in particular, the laser welding or friction stir welding processes regularly used in the manufacture of tailored welded blanks from aluminum sheets. To produce the joint, the side sections 3, 4 are preferably aligned bluntly against the edges 5, 6 of the central section 2 in order to obtain the flattest possible joint seams S1, S2.

In FIG. 1B, the course of the outer edge of a circumferential edge section 8 of the battery carrier B to be produced from the sheet metal blank 1 is shown as a dashed line.

The central section 2 and the side sections 3, 4 have each been cut from 3 mm thick sheets. The central section is made of the higher-strength aluminum material AA6063 in the T6 state, while the two ductile side sections 3, 4 are made of the more ductile aluminum material AA5754 in the 0 state. In the T6 state, the Al material AA6063 has a tensile strength Rm of 260 MPa and an elongation at break A of 7%. In contrast, the tensile strength Rm of the Al material AA5754 in the 0 state is 230 MPa and the elongation at break A is 22%.

In FIG. 1B, a central floor section 9 of the battery carrier B to be manufactured is also outlined with a dashed line.

The dotted lines in FIG. 1B indicate a depression 10 formed in the floor section 9 of the battery carrier B to be manufactured.

This makes it clear that, in the case of the sheet metal blank 1, the planar extent of the side sections 3, 4 and the central section 2 are selected in such a way that the corner areas 11a-11d of the side wall 12 of the battery carrier B to be manufactured, which are critical in terms of forming behavior, are formed in the ductile side sections 3, 4. In contrast, a substantial part of the length of the side wall sections 13, 14 of the battery carrier B to be manufactured, which run in a straight line and parallel to each other along the longitudinal sides L1, L2 of the battery carrier B and are therefore easy to form, is formed from the higher-strength Al material of the central section 2 of the sheet metal blank 1.

For forming into the battery carrier B, the sheet metal blank 1 is placed in a conventional press, not shown here, whose punch and die are shaped according to the desired shape of the battery carrier B. The press is used to form a blank R from the sheet metal blank 1, the basic shape of which already largely corresponds to the shape of the finished battery carrier B (FIG. 2).

The blank R therefore already has the central floor section 9 formed from the central section 2 of the sheet metal blank 1 with a recess 10 formed into it, the side wall 12 running around the floor section 9 and the edge section 8 protruding laterally from the side wall 12 in the manner of a collar and running around the battery carrier B.

In the following step, the edge section 8 is trimmed along the outer edge of the edge section 8 indicated by the dashed line (FIG. 1B, 2) in order to remove excess sheet metal sections (FIG. 3).

The blank R is then subjected to further forming, in which the areas of the edge section 8 that run parallel to the edges 5, 6 or the joining seams S1, S2 are provided with a depression 16, 17 extending over almost the entire width of the areas concerned (FIG. 4).

Finally, through-holes 18 are made in the depressions 16, 17 of the edge section 8, for example by a punching operation at regular intervals, which can be used for later attachment of the finished battery carrier B to a vehicle body not shown here or, preferably, for attachment of a cover, also not shown here, to the battery carrier B (FIG. 5).

The battery carrier B thus obtained, shown "upside down" in FIG. 6, i.e. with a view of its underside 19, therefore has a central floor section 9. The recess 10 is formed into the floor section 9 and extends over almost the entire surface of the floor section 9, except for an edge running around it.

The side wall 12 runs around the floor section 9. The side wall 12 is arranged at an angle to the floor section 9 such that an angle β of approximately 90° is formed between it and the floor section 9. The side wall 12 comprises the side wall sections 13, 14 consisting of the higher-strength Al material of the floor section 9, which extend along the longitudinal sides L1, L2 of the battery carrier B and are formed in one piece with the central floor section 9 from the central section 2 of the sheet metal plate 1. At their ends associated with the corner regions 11a-11d of the battery carrier B, the higher-strength side wall sections 13, 14 of the side wall 12 are extended by short side wall sections 20, 21, 22, 23, which are each formed from the side sections 3, 4 of the sheet metal blank 1. The short, ductile side wall sections 20-23 each meet a further ductile side wall section 24,25 of the side wall 12 in the corner region 11a-11d assigned to them, which is also formed from one of the ductile side sections 3,4 in each case and extends parallel to the joining seams S1, S2 along the respective transverse side Q1, Q2 of the battery carrier B.

In the battery carrier B, all areas that are problematic in terms of forming and the risk of cracking, in particular the corner areas 11a-11d, are thus arranged in the sections made of ductile Al material, while the central floor section 9 and the side wall sections 13, 14 associated with the longitudinal sides L1, L2, which together with the floor section 9 have to bear the main load of the battery elements to be accommodated by the battery carrier B, are made of higher-strength Al material.

The joint seams S1, S2 are also protected against stresses during the shaping of the battery carrier B by the fact that the critical areas during shaping are moved away from them into the ductile sections of the battery carrier B. For this purpose, the side wall sections 24, 25 consisting of the ductile Al material are shaped in such a way that they comprise a floor-side first side wall zone 26, which is joined to the outer corner region of the floor section 9 at its corner region associated with the floor section 9 and forms a lateral extension of the floor section 9, a second side wall zone 27 oriented at an angle relative to its first side wall zone 26 and the floor section 9, and a transition zone 28, via which the first side wall zone 26 merges into the second side wall zone 27.

The design and configuration of the battery carrier B according to the invention makes it possible to ensure a permanently tight shielding and an equally reliably stable hold of battery elements not shown here, which are arranged for use in the receiving space AR, which the battery carrier B delimits.

REFERENCE SIGNS

1 Sheet metal plate
2 Central section of the sheet metal plate 1
3,4 Side sections of sheet metal plate 1
5,6 Edges of the central section 2
8 Edge section of battery carrier B
9 Central floor section of battery carrier B
10 Indentation formed in the floor section
11a-11d Corner areas of the side wall
12 Side wall
13, 14 Higher-strength side wall sections
16, 17 Indentations in the edge section 8 (molded elements)
18 Passage openings
19 Underside of the battery carrier B
20-23 Short ductile side wall sections
24, 25 ductile side wall sections
26 Floor-side first sidewall zone of the ductile sidewall sections 24,25
27 second side wall zone of the ductile side wall sections 24,25
28 Transition zone of the ductile side wall sections 24,25
β Angle between the side wall 12 and the floor section 9
AR Receiving space
B Battery carrier
L Length of sheet metal plate 1
L1,L2 Longitudinal sides of the battery carrier B
Q1,Q2 Transverse sides of the battery carrier B
R Blank
S1,S2 Joining seams
W Width of sheet metal blank 1

The invention claimed is:

1. A battery carrier which is provided for being fastened in a floor region of a supporting structure of an electrically driven motor vehicle, wherein the battery carrier delimits a receiving space for at least one battery element to be positioned on a floor section and a side wall circulating the floor section and wherein the side wall comprises at least a first side wall section and a second side wall section which are each aligned at an angle β of more than 0° with respect to the floor section and meet in a corner region,
wherein
the floor section of the battery carrier is formed in one piece from a first aluminum material, and
the first and second side wall sections of the side wall meeting each other in the corner region, are formed in one piece from a second aluminum material which has a higher elongation at a break A than the first aluminum material,
wherein
the second aluminum material is different than the first aluminum material.

2. The battery carrier according to claim 1, wherein the first aluminum material has a tensile strength Rm of at least 170 MPa and an elongation at the break A of less than 10%.

3. The battery carrier according to claim 1, wherein the second aluminum material has an elongation at the break A of at least 10%.

4. The battery carrier according to claim 1, wherein the battery carrier has on two opposite sides respectively the first and a third side wall section which is formed in one piece with the floor section from the first aluminum material, and in that the second side wall section, which have a corner region of the battery carrier between the second side wall section and the first or third side wall section, forms an extension of one of the first or third side wall sections consisting of the second aluminum material of the floor section.

5. The battery carrier according to claim 4, wherein
the floor section has a rectangular basic shape when viewed from above,
the first or third side wall sections consisting of the first aluminum material respectively extends at longitudinal sides opposite to each other of the floor section, and
the second and a fourth side wall sections consisting of a first alloy material are respectively extended on their sides associated with the corner region of the battery carrier by a side wall section joined to them and consisting of the second aluminum material.

6. The battery carrier according to claim 5, wherein the first and third side wall sections run parallel to each other and are a higher-strength than the second and fourth side wall section.

7. The battery carrier according to claim 1, wherein the first aluminum material is an aluminum alloy of the 6000, 7000 or 8000 series (AlMgSi) and the second aluminum material is an aluminum alloy of the 3000, 4000 or 5000 series (AlMg).

8. A method for producing a battery carrier which is provided for being fastened in a floor region of a supporting structure of an electrically driven motor vehicle, wherein the battery carrier delimits a receiving space for battery elements to be positioned on a floor section and a side wall running around the floor section, and wherein the side wall comprises at least two side wall sections which are aligned at an angle β of more than 0° with respect to the floor section and meet in a corner region, comprising the following steps:
- a) providing a sheet metal blank which comprises a central section, which consists of a first aluminum material, and at least two side sections which are joined with their respective associated edge to opposite edges of the central section and consist at least partly of a second aluminum material, the first aluminum material having an elongation at a break A which is less than the elongation at the break A of the second aluminum material;
- b) forming the sheet metal blank into the battery carrier by forming a floor section and a side wall of the battery carrier circulating the floor section, wherein the corner region, in which two side wall sections of the side wall meet, are formed exclusively from the at least two side wall sections of the sheet metal blank consisting of the second aluminum material.

9. The method according to claim 8, wherein
the central section of the sheet metal blank provided in step a) extends over the entire width of the sheet metal blank, but only over a section of the length of the sheet metal blank, and
during the forming in step b), the mutually opposite edge sections of the central section extending between the at least two side sections of the sheet metal blank are each formed into a higher-strength side wall section of the battery carrier.

10. The method according to claim 9, wherein the higher-strength side wall sections consisting of the first aluminum material run parallel to one another.

11. The method according to claim 8, further comprising a step of trimming of an edge area of the side wall running around the floor section.

12. The method according to claim 8, further comprising a step of additional forming of the side wall or the floor section to form at least one additional shaping element.

13. The method according to claim 8, further comprising a step of inserting openings in the battery carrier.

\* \* \* \* \*